(12) United States Patent
McHugh et al.

(10) Patent No.: US 10,305,848 B2
(45) Date of Patent: May 28, 2019

(54) DETECTING LOSS OF DATA RECEIVED AT A DATA PROCESSING PIPELINE OF AN ONLINE SYSTEM DURING A SPECIFIED TIME INTERVAL

(71) Applicant: Facebook, Inc., Menlo Park, CA (US)

(72) Inventors: Jason George McHugh, Seattle, WA (US); Nickolay Vladimirov Tchervenski, Bothell, WA (US); Yin Yin, Kenmore, WA (US)

(73) Assignee: Facebook, Inc., Menlo Park, CA (US)

( * ) Notice: Subject to any disclaimer, the term of this patent is extended or adjusted under 35 U.S.C. 154(b) by 304 days.

(21) Appl. No.: 15/258,966

(22) Filed: Sep. 7, 2016

(65) Prior Publication Data

US 2018/0069823 A1   Mar. 8, 2018

(51) Int. Cl.
| H04L 12/58 | (2006.01) |
| G06Q 30/02 | (2012.01) |
| H04L 29/08 | (2006.01) |
| H04L 12/26 | (2006.01) |

(52) U.S. Cl.
CPC ......... *H04L 51/32* (2013.01); *G06Q 30/0277* (2013.01); *H04L 43/106* (2013.01); *H04L 67/104* (2013.01); *H04L 67/306* (2013.01)

(58) Field of Classification Search
CPC ... G06Q 30/0277; H04L 43/106; H04L 51/32; H04L 67/104; H04L 67/306
See application file for complete search history.

(56) References Cited

U.S. PATENT DOCUMENTS

| 2002/0097753 | A1* | 7/2002 | Cho | H04J 3/0682 370/519 |
| 2008/0049630 | A1* | 2/2008 | Kozisek | H04L 41/0823 370/250 |
| 2009/0168773 | A1* | 7/2009 | Crookes | H04N 21/23608 370/389 |
| 2010/0303156 | A1* | 12/2010 | Huang | H04N 21/4382 375/240.25 |
| 2011/0107220 | A1* | 5/2011 | Perlman | A63F 13/12 715/720 |
| 2014/0155043 | A1* | 6/2014 | Gell | H04L 67/02 455/414.1 |
| 2014/0280880 | A1* | 9/2014 | Tellis | H04L 41/5009 709/224 |

(Continued)

*Primary Examiner* — Joe Chacko
(74) *Attorney, Agent, or Firm* — Fenwick & West LLP

(57) ABSTRACT

An online system receives data and processes the data in a data processing pipeline. To data loss in the data processing pipeline, the online system determines a time interval during which each item of data is received and associates a set of counters with each time interval. For each time interval, an input counter is incremented for each data item received during the time interval and an output counter is incremented for each data item received during the time interval that was processed by the data processing pipeline. The online system compares an input number from the input counter and an output number from the output counter for each time interval. Based on a difference between the input number and output number for a time interval, the online system determines if a loss of data received during the time interval occurred. Lost Data are identified and processed.

24 Claims, 4 Drawing Sheets

(56) References Cited

U.S. PATENT DOCUMENTS

| | | | |
|---|---|---|---|
| 2015/0142953 A1* | 5/2015 | Bayen | H04L 67/22 |
| | | | 709/224 |
| 2015/0215058 A1* | 7/2015 | Yi | G09G 5/006 |
| | | | 370/350 |
| 2016/0210321 A1* | 7/2016 | Gong | G06F 17/30345 |
| 2017/0060769 A1* | 3/2017 | Wires | H04L 12/6418 |

* cited by examiner

DETECTING LOSS OF DATA RECEIVED AT A DATA PROCESSING PIPELINE OF AN ONLINE SYSTEM DURING A SPECIFIED TIME INTERVAL

BACKGROUND

This disclosure relates generally to online systems, and more specifically to processing data received at a data processing system of an online system.

Online systems, such as social networking systems, allow users to connect to and to communicate with other users of an online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users. Content provided to an online system by a user may be declarative information provided by a user, status updates, check-ins to locations, images, photographs, videos, text data, or any other information a user wishes to share with additional users of the online system. An online system may also generate content for presentation to a user, such as content describing actions taken by other users on the online system.

Additionally, many online systems commonly allow publishing users (e.g., businesses) to sponsor presentation of content on an online system to gain public attention for a publishing user's products or services or to persuade other users to take an action regarding the publishing user's products or services. Content for which the online system receives compensation in exchange for presenting to users is referred to as "sponsored content." Many online systems receive compensation from a publishing user for presenting online system users with certain types of sponsored content provided by the user. Frequently, online systems charge a publishing user for each presentation of sponsored content to an online system user or for each interaction with sponsored content by an online system user. For example, an online system receives compensation from a publishing user each time a content item provided by the publishing user is displayed to another user on the online system or each time another user is presented with a content item on the online system and interacts with the content item (e.g., selects a link included in the content item), or each time another user performs one or more particular actions after being presented with the content item (e.g., visits a website or physical location associated with the user who provided the content item).

An online system that provides content to its users in exchange for compensation from a user (i.e., sponsored content) may provide a publishing user who provided content to the online system with various metrics describing certain actions performed by other users of the online system after being presented with such sponsored content to describe the effectiveness of the sponsored content at eliciting the certain actions. For example, an online system presents users with a content item and maintains a number of users who select a link included in the content item or a number of times the users visit a website associated with the content item during a particular time interval based on information received from client devices on which users interact with the content item. Based on the number of users who selected a link included in the content item or a number of times the users visited the website associated with the content item after being presented with the content item, the online system determines a metric and includes the metric in a report describing the content item's effectiveness that is provided to a publishing user associated with the content item.

Determining metrics describing actions performed by users of an online system often involves performing complex, resource-intensive operations on large amounts of data in short periods of time to extract, analyze and process information to provide meaningful reports. For example, to generate metrics describing events associated with various content items presented at different time intervals by an online system, the online system quickly receives, formats, analyzes, organizes, and presents the required information to generate metrics for various content items. To efficiently process the significant amount of information required to generate various metrics, online systems often use data processing pipelines capable of processing an incoming stream of data in a short amount of time. For example, a data processing pipeline distributes operations among various components of the data processing pipeline to quickly process the incoming stream of data. A data processing pipeline may include components operating on different computing devices and in different locations in various implementations.

However, in some circumstances, data received at a data processing pipeline may be lost in the pipeline before or during processing, causing inaccurate determination of metrics. For example, a data processing pipeline having multiple components each performing a specified process on individual pieces of data as they move through the pipeline loses a piece of data (e.g., a component fails to process the piece of data due to power failure or logic error) during processing. If data is lost in the pipeline and the loss is not detected, metrics based on the lost data may be incomplete or inaccurate. For example, if the online system performs a series of additive operations on data being processed through a data processing pipeline to measure a number of times a user interacts with a particular content item after being presented with the content item, the measurement is inaccurately low if data describing user interactions with the content item are lost in the data processing pipeline during processing. Accordingly, metrics based on data lost in the data processing pipeline will also be inaccurately low if the online system does not detect and correct for the lost data when determining the metrics. Hence, undetected loss of data in a data processing pipeline at the online system may cause an online system to generate metrics that inaccurately describe performance of various content items presented on the online system.

SUMMARY

An online system receives data describing occurrence of certain events associated with content items presented to online system users and performs one or more operations to analyze the data in a data processing pipeline. For example, the online system receives an unordered stream of data describing interactions between users of the online system and content items created by additional users of the online system and performs a series of operations to analyze the data as it is received in the data processing pipeline. The data may be received from various third party systems providing content (e.g., an advertisement server, a game server, a mail server, a web server, etc.) or from the online system itself. Hence, the data may be received from any source that that presents content to users of the online system and captures data associated with the presentation of such content. Events described by data received by the online system include interactions between users of the online system and content items (e.g., user-generated stories, advertisements, etc.) presented to the users by the online system. In various embodiments, the online system stores the received data along with information describing a time each individual piece of data ("data item") was received at the online system (e.g., a timestamp).

Example operations the online system performs in the data processing pipeline include validating data, converting data, organizing data, summarizing data, aggregating data, interpreting data, presenting, data, storing data, and other data analysis processes. Data analysis processes may be additive, so the order in which data is received and processed does not affect processing. The operations to analyze data may also be performed in a distributed manner among various data processing modules of the data processing pipeline. For example, data processing modules operating on different computing devices and in different locations perform various operations, in some embodiments. Data may be received and processed through the pipeline in real time (i.e., as it is received at the online system) in some embodiments, minimizing delay in the online system's receipt and processing of the data. After data is processed through the data processing pipeline, the online system may store the processed data for further processing or querying. In one embodiment, the processed data is stored and retrieved to generate reports (e.g., content performance metrics) provided to users of the online system who created content items associated with the data, allowing the users to evaluate the content items' effectiveness at influencing online system users to perform certain actions after being presented with the content items.

To detect loss of data as it is processed by the data processing pipeline, the online system determines a time interval during which each data item is received at the pipeline (e.g., based on a timestamp associated with each data item) and associates a set of counters with each time interval. For example, the online system divides a 24 hour period during which data items are received at the online system into 15 minute time intervals and associates a set of counters with each 15 minute time interval to track the number of data items received and processed through the data processing pipeline for each 15 minute time interval. In various embodiments, the set of counters associated with each time interval includes an input counter that stores a number of data items received during the time interval and an output counter that stores a number of data items received during the same time interval that were processed by at least a threshold number of data processing modules (e.g., every data processing module) of the data processing pipeline.

For each time interval, the online system increments the input counter each data item received at the input of the pipeline during the time interval and increments the output counter for each data item that was received at the input of the data processing pipeline during the time interval and that was also output from the data processing pipeline within a predetermined period of time. For example, when a data item is received at the input of the data processing pipeline, the online system determines a time the data item was received (e.g., based on a timestamp associated with the data item) and increments an input counter associated with a time interval including the determined time. Similarly, when a data item is received at the output of the data processing pipeline, the online system determines a time when the data item was received at the input of the data processing pipeline (e.g., based on a timestamp associated with the data item) and increments an output counter associated with the time interval that includes the determined time when the data item was received at the input of the data processing pipeline if the data item was output from the data processing pipeline within a predetermined period of time. Hence, the input counter stores the number of data items received at the input of the data processing pipeline by the online system during a time interval associated with the input counter, while an output counter associated with the same time interval stores the number of data items received during the time interval that were fully processed by the data processing pipeline (i.e., output from the data processing pipeline) within a predetermined period of time.

In some embodiments, for each time interval, a module input counter or a module output counter is associated with each data processing module of the data processing pipeline. For each time interval, the module input counter associated with a particular data processing module is incremented for each data item received at the input of the data processing pipeline and that is received by the particular data processing module during a time interval, while the module output counter associated with the particular data processing module that is received at the input of data processing pipeline and output from the particular data processing module during the time interval. Hence, the module input counter associated with a particular a data processing module identifies number of data items received by the data processing module that were received at the input of the data processing pipeline during the time interval with which the module input counter is associated. Similarly, the module output counter associated with the particular data processing module identifies a number of data items received at the input of data processing pipeline and processed by the particular data processing module during the time interval associated with the module output counter.

For each time interval, the online system compares the number identified by the input counter associated with a time interval to the number identified by the output counter associated with the time interval after a predetermined period of time has elapsed from an end of the time interval. In some embodiments, the predetermined period of time is a maximum amount of time allowed by the online system to process all data items received during a time interval, allowing enough time for each data item received during the time interval to be processed by the data processing pipeline and counted by the output counter associated with the time interval. For example, if the data processing pipeline takes approximately one hour to fully process a data item, the online system retrieves an input number of data items identified by the input counter for a time interval and an output number of data items identified by the output counter for the time interval one hour after the end of the time interval and compares the input number and output number for the time interval.

The online system determines a difference between the input number and the output number for the time interval and determines whether data items received during a particular time interval were lost in the data processing pipeline during the time interval based on the computed difference. For example, the online system compares an input number identifying receipt of 100 data items at the input of the data processing pipeline during a time interval associated with the input number and an output number identifying 94 data items received during the time interval were received at the input of the data processing pipeline and processed by the data processing pipeline during the time interval. Based on the comparison, the online system determines that six data items received during that time interval were lost in the data processing pipeline. The online system may also determine a data processing module within the data processing pipeline where data items received during a particular time interval were lost by comparing a module input counter and a module output counter for various data processing modules for the particular time interval. For example, the online system compares a module input counter of 100 for a data processing element for a time interval to a module output counter of 95 for the data processing element for the time interval to determine that 5 data items were lost while being processed by the data processing element. Hence, comparing input counters and output counters associated with a time interval, the online system determines whether data received during the time interval was lost when being processed by the data processing pipeline; similarly, comparing module input counters and module output counters for different data processing modules of the data processing pipeline allows the online system to identify a location in the data processing pipeline where a loss of data occurred.

Upon detecting a loss of data in the data processing pipeline, the online system may identify lost data items and send the lost data items back through the data processing pipeline for processing, in some embodiments. The online system may identify lost data items by comparing a copy of a data store generated at a time when all data items received during a time interval for which a loss of data has been detected have been stored with an additional copy of the data store generated at a time when all data items received during the time interval have been processed. Data items included in the copy but not included the second copy are identified by the online system as lost data items. In embodiments where the order in which the data items are received and processed is not significant, the online system may send a data item that has been identified as lost in the data processing pipeline to one or more data processing modules of the data processing pipeline to complete processing. For example, if the online system determines a data item was lost in the data processing pipeline at a second data processing module, the online system retrieves a copy of the lost data item from a stored copy of a buffer between a first data processing module and the second data processing module and sends the copy of the lost data item to the second data processing module to be processed by the second data processing module and passed through the remainder of the data processing pipeline to complete processing.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
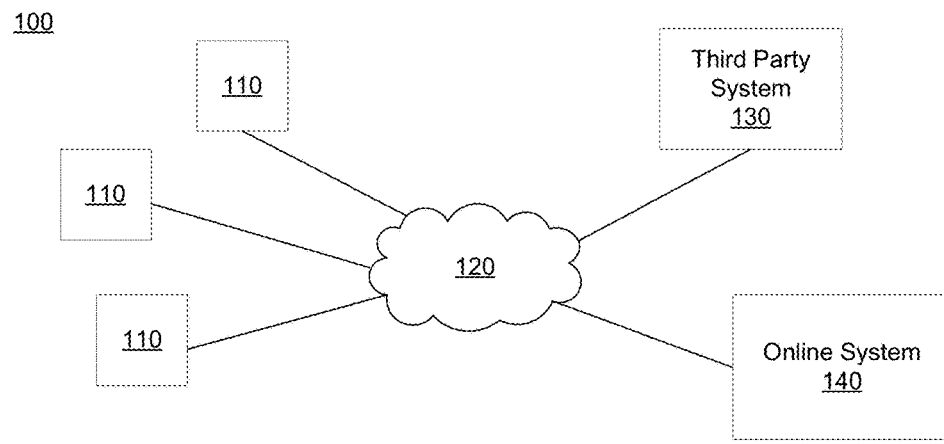
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The online system 140 may be a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. A third party system 130 may also communicate information to the online system 140, such as advertisements, content, or information about an application provided by the third party system 130.

In some embodiments, one or more of the third party systems 130 provide content to the online system 140 for presentation to users of the online system 140 and provide compensation to the online system 140 in exchange for presenting the content. For example, a third party system 130 provides content items to the online system 140 for presentation to online system users and amounts of compensation provided by the third party system 130 to the online system 140 in exchange presenting content items to the online system users. Content for which the online system 140 receives compensation in exchange for presenting is referred to herein as "sponsored content." Sponsored content from a third party system 130 may be associated with the third party system 130 or with another entity on whose behalf the third party system 130 operates.

Figure 2:
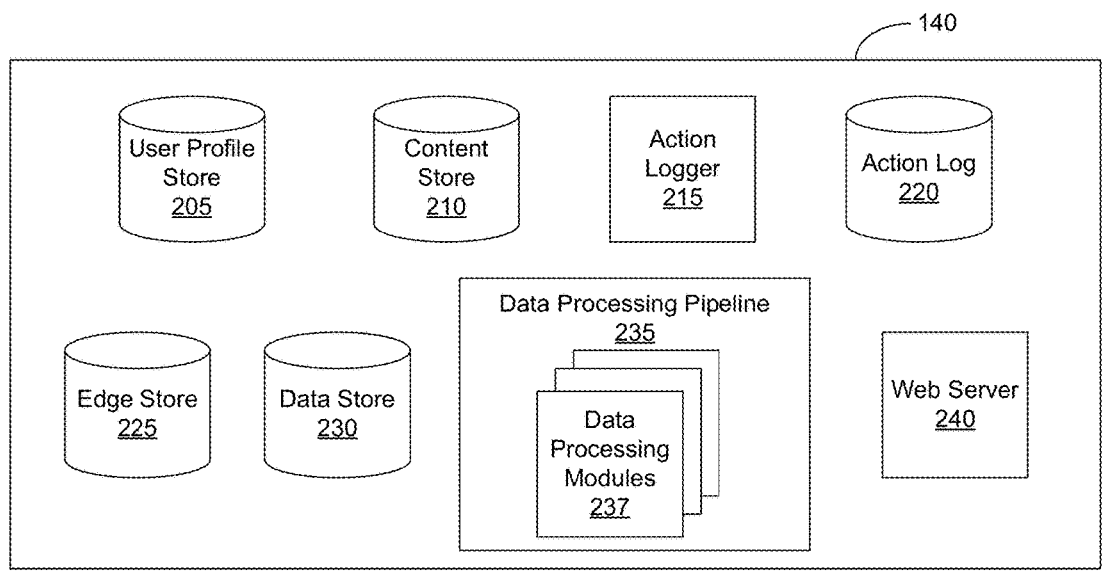
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a data store 230, a data processing pipeline 235 comprising a plurality of data processing modules 237, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity. In some embodiments, the brand page associated with the entity's user profile may retrieve information from one or more user profiles associated with users who have interacted with the brand page or with other content associated with the entity, allowing the brand page to include information personalized to a user when presented to the user.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications, such as third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), engaging in a transaction, viewing an object (e.g., a content item), and sharing an object (e.g., a content item) with another user. Additionally, the action log 220 may record a user's interactions with content items on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, content that was engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features that each represent characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or a particular user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The data store 230 stores data items (e.g., data packets) received by the online system 140 from various third party systems 130 (e.g., an ad server, a game server, a mail server and/or web server), from client devices 110, or generated by components of the online system 140. Hence, the data store 230 receives data items from sources that may be internal to or external to the online system 140. Additionally, the data store 230 receives information describing the data items along with the data items. In various embodiments, various data items received by the online system 140 that each describe an occurrence of certain events are stored in the data store 230 along with additional information describing the data items. For example, each data item includes a header having information identifying a sender of the data item, a time the data item was sent to the online system 140, and a format of the data item; further, a data item includes a body having information describing an occurrence of an event and a trailer including instructions for processing the data item at the online system 140.

In various embodiments, events described by the data items include events associated with a user profile on the online system 140 of a user, such as interactions between users of the online system 140 and content items presented to the users by the online system 140. In various embodiments, information stored in the data store 230 along with a data item describes one or more of: a time the data item was received at the online system 140, an online system user associated with the data item, a content item associated with the data item, and formatting information (e.g., a state of the data item) at the time the data item is stored. For example, the online system 140 generates a unique data item identifier describing each data item and a timestamp describing a time when the online system 140 received the data item. The online system 140 stores the data item identifier and the timestamp along with the data item in the data store 230.

In various embodiments, the online system 140 stores data items in the data store 230 when the online system 140 receives the data items and again stores the data items when an event occurs or at various intervals of time as the data items are processed. For example, the online system 140 stores a data item in the data store 230 at a time when the data item is received by the online system 140 and updates the data store 230 after the data item has been processed by one or more data processing modules of a data processing pipeline, so the data store 230 includes the data item in one or more states where it has been processed or partially processed by the data processing pipeline. Hence, data items stored in the data store 230 are stored in various states corresponding to processing of the data items by the online system 140. In some embodiments, the online system 140 generates copies of the data store 230 (e.g., upon the occurrence of an event or at various pre-determined time intervals) to archive the data items in their various states. In certain embodiments, the online system 140 retrieves copies of the data store 230 and compares the copies to identify data items lost during processing by the online system 140 (e.g., during processing by a data processing pipeline at the online system 140), as further described below in conjunction with FIG. 3.

The data processing pipeline 235 performs a series of operations to process data items received by the online system 140. For example, the data processing pipeline 235 accesses, reads, analyzes, validates, formats, organizes, or stores data items received by the online system 140 and stored in the data store 230 to extract and process information included in the data items for use by the online system 140. Operations performed by the data processing pipeline 230 may be performed in a distributed manner among various data processing modules 237 or other components of components of a data processing pipeline 235. In various embodiments, different data processing modules 237 of the data processing pipeline may operates on different computing devices and in different locations. Multiple data items may be simultaneously processed by the data processing pipeline 235 as they are received by the online system 140 (e.g., in real time) in some embodiments. Alternatively the data processing pipeline 235 processes data items are processed upon the occurrence of an event (e.g., a request or query) or at various pre-determined time intervals. In various embodiments, the data processing pipeline 235 processes data items in a manner where an order in which the data items are received and processed by the data processing pipeline 235 does not influence processed states of various data items, also referred to herein as processing data items in "an additive manner."

In various embodiments, the data processing pipeline 235 comprises an input, an output, and a plurality of data processing modules 237 coupled in series with each other. The input is coupled to a data processing module 237, and the output of the data processing module 237 is coupled to an input of another data processing module 237 or to an output of the data processing pipeline 235. Any number of data processing modules 237 may be coupled together in series to form the data processing pipeline 235 in various embodiments. Hence, a data item received at the input of the data processing pipeline 235 passes through various data processing modules 237, which perform one or more operations on the data item, until reaching the output of the data processing pipeline 235. Different data processing modules 237 perform one or more operations on a data item processed by the data processing pipeline 235. Example operations performed by a data processing module 237 include: validating, converting, organizing, summarizing, aggregating, interpreting, presenting and/or storing a data item.

In some embodiments, data items processed by a data processing module 237 are temporarily stored in a storage device (e.g., a buffer, a memory) coupled to an output of the data processing module 237 and an input of an additional data processing module 237. Hence, the storage device allows a data item that has been processed by the data processing module 237 to be stored until the additional data processing module 237 is capable of processing, or has processed, the data item. For example, a buffer coupled to an output of the data processing module 237 and to an input of an additional data processing module temporarily stores a data item after it has been processed by the data processing module 237 and before the additional data processing module 237 is capable of processing the data item. The online system 140 may generate a copy of a storage device coupled to an input of a data processing module 237 and to an output of another data processing module 237 or generate a copy of a data item stored in the storage device. The copy of the data item may be subsequently processed by the data processing module 237 whose input is coupled to the storage device. This allows the online system 140 to subsequently retrieve the data item, or a state of the data item, prior to being processed by the data processing module 237, allowing the online system 140 to later recover or repair the data item if it is lost or erroneously altered in the data processing pipeline 235. After a data item is processed by every data processing module 237 comprising the data processing pipeline 235 and is received at the output of the data processing pipeline 235, the online system 140 stores the data item in its fully processed state for further analysis or other use, in various embodiments. For example, the online system 140 stores fully processed data items from the output of the data processing pipeline 235 and generate metrics describing the effectiveness of content items described by the fully processed data items at influencing user interactions with the content items.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, or BlackberryOS.

Figure 3:
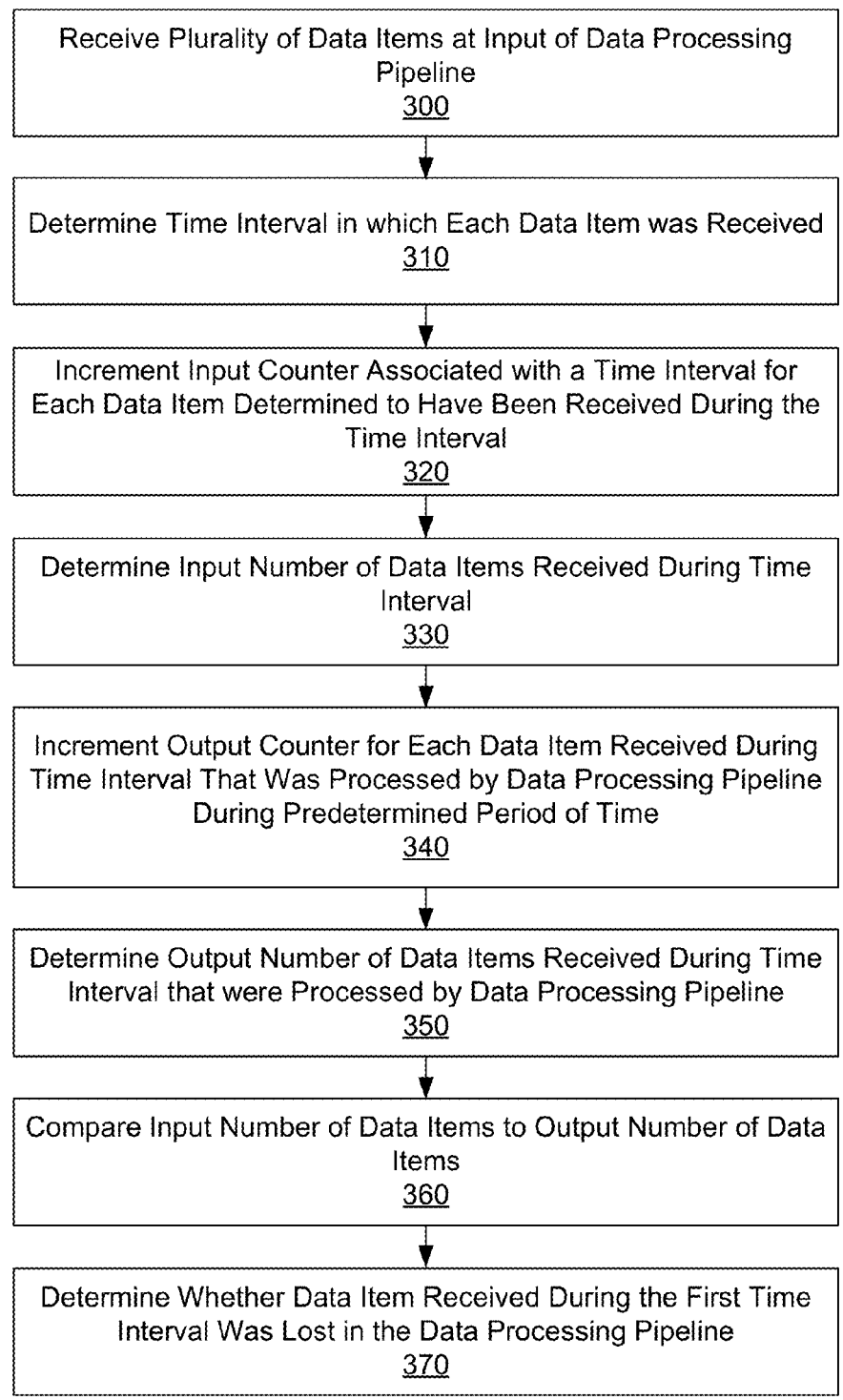
FIG. 3 is a flowchart of a method for detecting loss of data received at a data processing pipeline of an online system during a specified time interval, in accordance with an embodiment.

Detecting Data Loss During a Specified Time Interval from a Data Processing Pipeline FIG. 3 is a flowchart of one embodiment of a method for detecting loss of data received at a data processing pipeline of an online system 140 during a specified time interval. In other embodiments, the method may include different and/or additional steps than those shown in FIG. 3. Additionally, steps of the method may be performed in different orders than the order described in conjunction with FIG. 3 in various embodiments.

The online system 140 receives 300 a plurality of data items at an input of a data processing pipeline 235 that performs a series of operations on the data items. Example operations performed by the data processing pipeline 235 include: extracting, analyzing, organizing and storing information included in the data items. The received data items may each describe an occurrence of one or more events. In various embodiments, the one or more events described by the data items include interactions between an online system user and a content item presented to the online system user by the online system 140 or by a third party system 130. A data item may describe a frequency or a number of times an online system user accessed certain content items presented to the user during various time intervals or accessed websites associated with the content items after being presented with the content items. For example, a data item describes a number of times a user clicks, hovers, or taps on a link included in a content item presented by the online system 140 or by a third party system 130 in a display area of a client device 110. In one embodiment, the online system 140 receives 300 data items from a third party system 130 describing content items presented to users of the online system 140 by the third party system 130 and interactions of the users with the content items or with websites associated with the content items. In another embodiment, the online system 140 receives 300 data items from one or more third party systems 130 describing purchases of products or services by one or more users of the online system 140 within a threshold interval of time from a time when a user is presented with a content item associated with the products or services.

The data items may be received 300 from a third party system 130, such as an ad server, a game server, a mail server, a web server or another content server. Similarly, the data items may be received 300 from one or more components of the online system 140. Hence, the data items may be received 300 from any source or combination of sources internal to or external to the online system 140 that captures data associated with presentation of content to users of the online system 140. In various embodiments, data items are received 300 by the online system 140 and stored (e.g., in the data store 230) along with information describing a time when the online system 140 received 300 each data item, allowing the online system 140 to track times when various data items were received 300 at the input of the data processing pipeline 235. For example, the online system 140 associates a timestamp with each data item describing a time when a data item is received 300 at the input of the data processing pipeline 235 and stores the timestamp in association with the data item. The online system 140 may also generate a unique data item identifier each received data item and store the unique data item identifier in association with a data item to track data items as they are processed through the data processing pipeline 235, in some embodiments.

The online system 140 divides a period of time during which the plurality of data items are received 300 at the input of the pipeline into a plurality of consecutive time intervals and determines 310 a time interval during which each data item was received. For example, the online system 140 divides a 24-hour period during which data items are received 300 into 96 consecutive 15 minute time intervals and associates each received data item with a 15-minute time interval in which the data item was received 300. In various embodiments, the online system 140 identifies a timestamp or other information associated with a received data item identifying a time at which the data item was received 300 at the input of the pipeline and determines 310 the data item was received during a time interval that includes the time identified by the timestamp or other retrieved information.

Each of the consecutive time intervals is associated with an input counter, and the online system 140 increments 320 the input counter associated with a particular time interval for each data item determined 310 to have been received 300 during the particular time interval. Each input counter is initialized to zero and an input counter associated with a time interval is incremented by one (or another constant value) for each data item determined 310 to have been received 300 during the time interval. Hence, the input counter associated with a time interval maintains a count of a number of data items received 300 during the time interval. For example, the online system 140 associates an input counter with a time interval from 12:00 AM to 12:15 AM that is initialized to zero at the beginning of the time interval and increments 320 the input counter by one for each data item determined 310 to have been received 300 at the input of the pipeline 235 between 12:00 AM and 12:15 AM.

In some embodiments, the online system 140 associates a module input counter with each of a plurality of data processing modules 237 of the data processing pipeline 235 for each of the plurality of time intervals and increments a module input counter associated with a particular data processing module 237 and with a particular time interval when a data item received 300 at the input of the data processing pipeline 235 during the particular time interval is received at the particular data processing module 237. For example, the online system 140 determines a data item received at a data processing module 237 was received 300 at the input of the data processing pipeline 235 during a particular time interval based on a timestamp associated with the data item identifying a time the data item was received 300 at the input of the data processing pipeline 235 and increments the module input counter associated with the data processing module 237 and with the particular time interval. The online system 140 may associate a module input counter with each data processing module 237 of the data processing pipeline 235 or with a subset of the data processing modules 237 of the data processing pipeline 235 in various embodiments.

Figure 4:
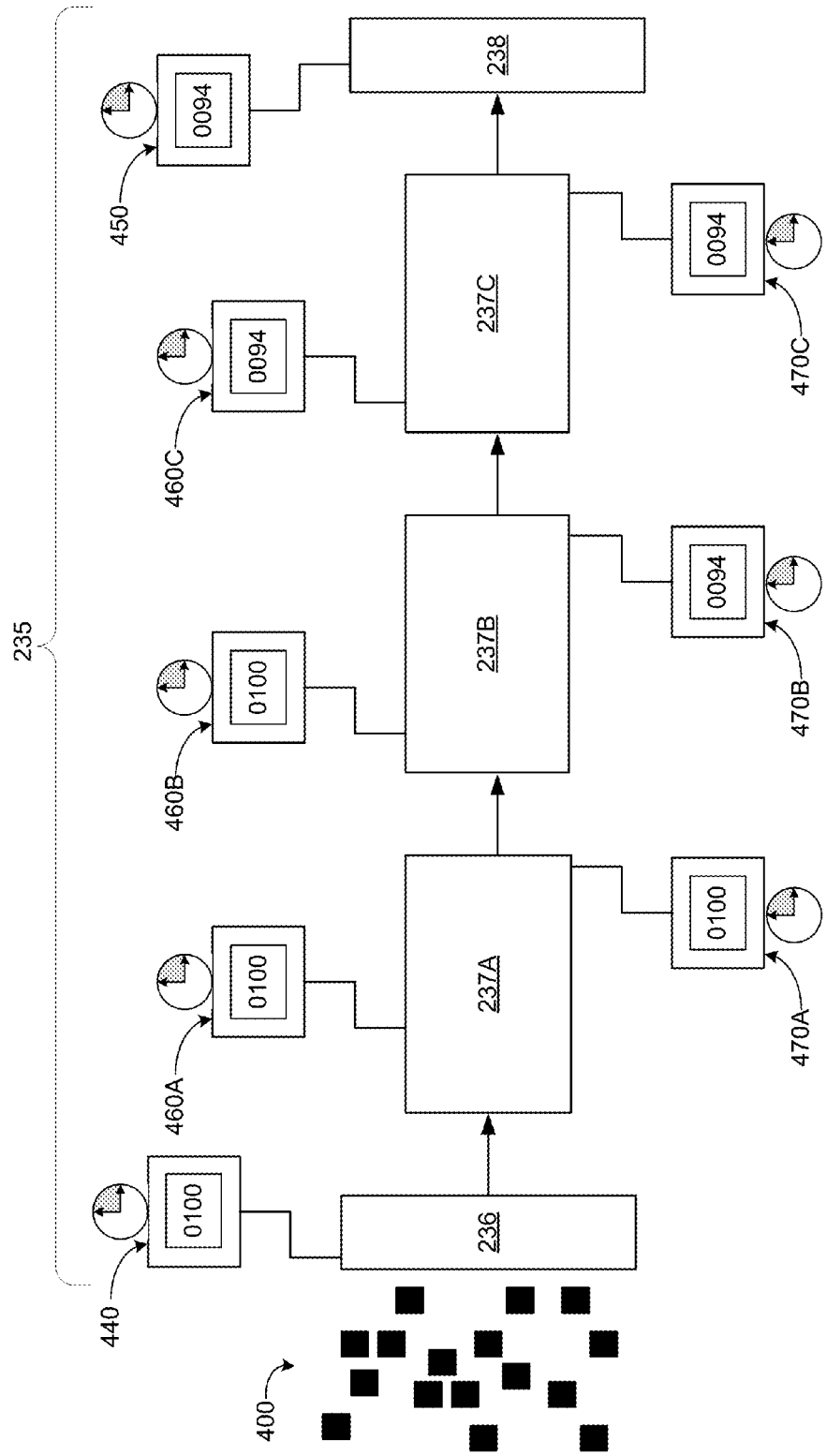
FIG. 4 is an example of a data processing pipeline comprising a plurality of data processing modules and a set of counters associated with a time interval, in accordance with an embodiment.

FIG. 4 is an example of a data processing pipeline 235 comprising multiple data processing modules 237 during a time interval. In the example of FIG. 4, a set of counters are associated with various data processing modules 237 and with the time interval. For purposes of illustration, the data processing pipeline 235 shown in FIG. 4 includes an input 236 at the beginning of the pipeline 235 that receives 300 a plurality of data items 400 for processing by the data processing pipeline 235, an output 238 at the end of the data processing pipeline 235 that receives data items after they have been processed by the data processing pipeline 235, and a plurality of data processing modules 237A-C coupled to each other in series, so an input of a data processing module 237B, 237C is an output of another data processing module 237A, 237B. An input of data processing module 237A is coupled to the input 236 of the data processing pipeline 235, and an output of data processing module 237C is coupled to the output 238 of the data processing pipeline 235.

In the example of FIG. 4, the online system 140 receives 300 a plurality of data items 400 at the input 236 of the data processing pipeline 235, determines each data item of the plurality of data items 400 was received 300 during a time interval between 12:00 AM and 12:15 AM, associates an input counter 440 with the time interval and also associates a module input counter 460A-C with each of the plurality of data processing modules 237A-C and with the time interval. The online system 140 increments the input counter 440 for each data item 400 received 300 during the time interval and also increments a module input counter 460A-C associated with each data processing module 237A-C for each data item received by a data processing module 237A-C that was also received 300 at the input 236 of the data processing pipeline 235 during the time interval.

Based on the value of the input counter 440 associated with each of the plurality of time intervals at the end of each time interval, the online system 140 determines 330 an input number of data items received 300 at the input 236 of the data processing pipeline 235 during each time interval. For example, the input number of data items received 300 during a particular time interval is a number of times the input counter 440 was incremented 320 during the particular time interval (i.e., the value of the input counter 440 at the end of the particular time interval). Similarly, the online system 140 determines a number of data items received 300 at the input 236 of the data processing pipeline 235 during each time interval that were also received by each data processing module 237A-C of the data processing pipeline 235 based on the values of module input counters 460A-C associated with each data processing module 237A-C of the data processing pipeline 235 at the end of each time interval, in some embodiments. In the example of FIG. 4, the online system 140 determines 330 an input number of 100 data items were received 300 at the input 236 of the data processing pipeline 235 during the time interval between 12:00 AM and 12:15 AM. The online system 140 also determines that 100 of the data items received 300 at the input 236 of the data processing pipeline 235 during the time interval between 12:00 AM and 12:15 AM were also received by data processing modules 237A, 237B of the data processing pipeline 235 during the time interval between 12:00 AM and 12:15 AM. Additionally, the online system 140 determines that 94 of the data items received 330 at the input 236 of the data processing pipeline 235 during the time interval between 12:00 AM and 12:15 AM were also received at data processing module 237C of the data processing pipeline 235 during the time interval between 12:00 AM and 12:15 AM.

The online system 140 also associates an output counter with each of the plurality of time intervals and increments 340 the output counter associated with a particular time interval for each data item received 300 during the time interval that was processed by every data processing module 237 of the data processing pipeline 235 during a predetermined period of time. In various embodiments, when a data item is received at the output 236 of the data processing pipeline 235, the online system 140 determines a time the data item was received 300 at the input 236 of the data processing pipeline 235 (e.g., based on a timestamp associated with the data item) and increments 340 an output counter associated with a time interval that includes the determined time if the time when the data item is received at the output 236 of the data processing 235 pipeline is within a predetermined period of time including the time interval and an amount of time following the time interval that includes the determined time. Returning to the illustration of FIG. 4, the online system 140 associates an output counter 450 with the time interval between 12:00 AM and 12:15 AM. The output counter 450 is initialized to zero and is incremented by a value of one for each data item received 300 at the input 236 of the pipeline 235 during the time interval between 12:00 AM and 12:15 AM and that is also received at the output 238 of the pipeline 235 during a predetermined period of time comprising the time interval and amount of time following the time interval between 12:00 AM and 12:15 AM (e.g., during 10 minutes following 12:15 AM).

In various embodiments, the predetermined period of time includes the time interval associated with the output counter 450 is associated and a period immediately following the time interval. The period immediately following the time interval may be based on an expected length of time for the data processing pipeline 235 to process a data item. For example, if it takes approximately 20 minutes the data processing pipeline 235 to process a data item, the predetermined period of time includes the time interval associated with the output counter 450 and at least 20 minutes immediately following the time interval associated with the output counter 450. In this example, the predetermined period of time allows the output counter 450 to be incremented by a data item received 300 at the end of a time interval by providing sufficient time for the data item time to be processed by every data processing module 237 of the data processing pipeline 235 before reaching the output 238 of the data processing pipeline 235.

The online system 140 may also associate a module output counter with each of the plurality of data processing modules 237 of the data processing pipeline 235 for each of the plurality of time intervals to track a number of data items received 300 by the data processing pipeline 235 during each time interval that are processed by various the data processing modules 237. In the example of FIG. 4, the online system 140 associates a module output counter 470A-C with each of the plurality of data processing modules 237A-C for a time interval between 12:00 AM and 12:15 AM. Each module output counter 470A-C is initialized to zero and incremented by a value of one for each data item received 300 at the input 236 of the pipeline 235 during the time interval between 12:00 AM and 12:15 AM that is also processed within a predetermined amount after 12:15 AM by the data processing module 237A-C associated with an output counter 470A-C (i.e., that is output by the data processing module 237A-C within a predetermined amount of time after 12:15 AM). As another example, when a data processing module 237A-C finishes processing a data item (i.e., outputs the data item), the online system 140 determines a time the data item was received 300 at the input 236 of the data processing pipeline 235 (e.g., based on a timestamp associated with the data item) and increments the module output counter 470A-C associated with a data processing module 237A-C and with a time interval including the determined time the data item was received 300.

Based on value of the output counter 450 associated with each of the plurality of time intervals (e.g., the value of an output counter 450 associated with a time interval at the end of the predetermined period of time associated with the time interval), the online system 140 determines 350, for each time interval, an output number of data items received 300 at the input 236 of the data processing pipeline 235 during the time interval that were processed by each data processing module 237 of the data processing pipeline 235. For example, the output number of data items for a particular time interval is a number of times an output counter 450 associated with the particular time interval was incremented 340 for data items received 300 during the particular time interval that were processed by every data processing module 237 of the data processing pipeline 235 during the predetermined period of time (e.g., during the particular time interval and a predetermined amount of time immediately following the particular time interval). In the example of FIG. 4, the online system 140 determines 350 an output number of 94 data items received at the output 238 of the pipeline 235 during a predetermined period of time that were received 300 at the input 236 of the pipeline 235 during the time interval between 12:00 AM and 12:15 AM. Hence, in the example of FIG. 4, 94 data items received during the time period were processed by every data processing module 237A-C of the pipeline 235 during the predetermined period of time (e.g., during the time interval and a predetermined amount of time immediately following the time interval).

In some embodiments, the online system 140 also determines a number of data items received 300 during each time interval that were processed by different data processing modules 237 of the data processing pipeline 235 based on module output counters 470 associated with different data processing modules 237 and each time interval. In the example of FIG. 4, the online system 140 retrieves each module output counter 470A-C at the end of a predetermined period of time (e.g., a period including the time interval and a predetermined amount of time following the time interval) and determines that 100 data items received 300 at the input 236 of the data processing pipeline 235 during the time interval were processed by data processing module 237A. The online system 140 also determines 94 of the data items received 300 at the input 236 of the data processing pipeline 235 during the time interval were processed by data processing module 237B, and 94 of the data items received 300 at the input 236 of the data processing pipeline 235 during the time interval were processed by data processing module 237C.

Figure 5:
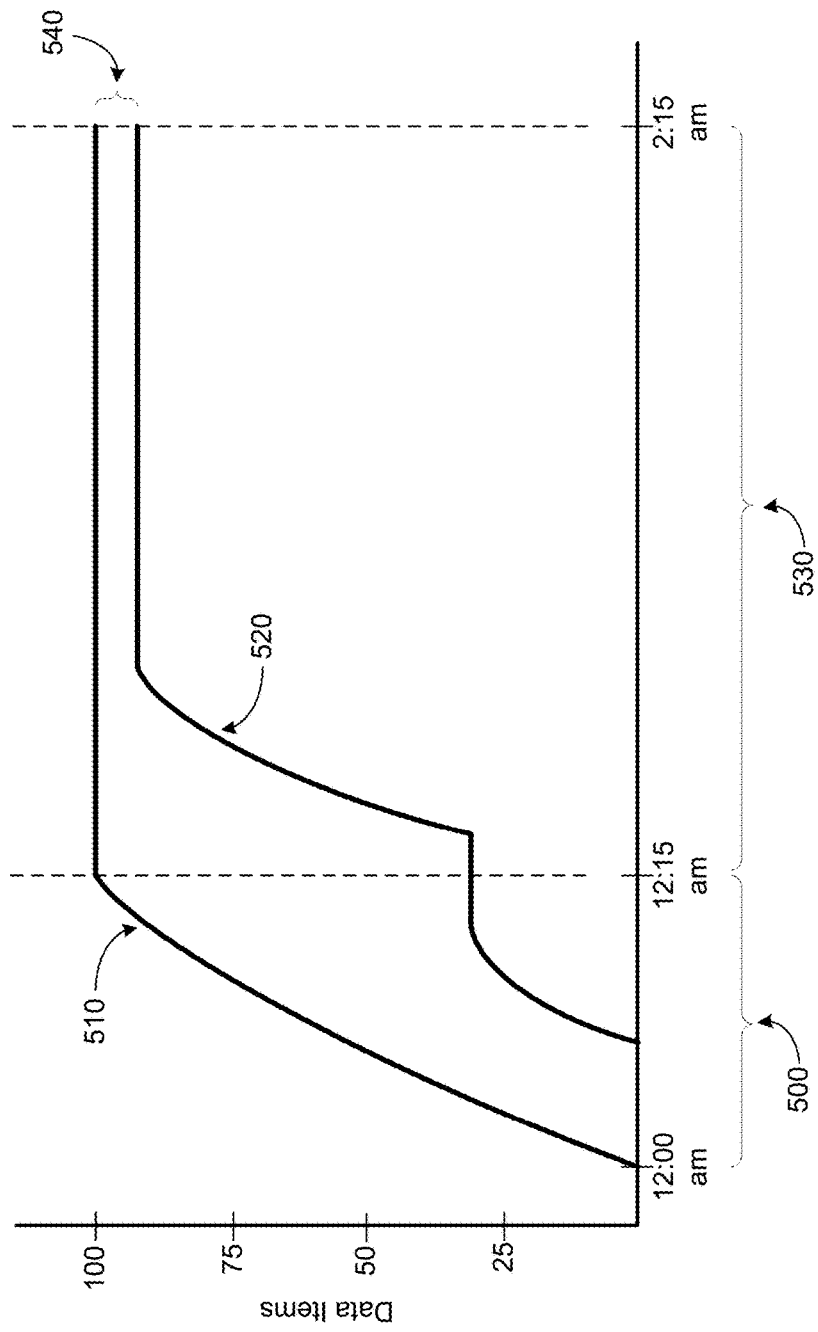
FIG. 5 is a graph of an example comparison of an input number of data items received during a time interval and an output number of data items processed during the time interval, in accordance with an embodiment.

The online system 140 compares 360 the input number of data items to the output number of data items for one or more of the plurality of time intervals (e.g., each of the plurality of time intervals), and determines 370 whether a data item received 300 during a particular time interval was lost in the data processing pipeline 235 based on the comparison. In various embodiments, the online system 140 computes a difference between an input number of data items for a particular time interval and an output number of data items for the particular time interval and determines 370 one or more data items received during the particular time interval were lost in the data processing pipeline 235 (i.e., not processed by every data processing module 237 of the pipeline) if the difference between the input number and output number is greater than zero. In the example of FIG. 5, the online system 140 compares 360 an input number 510 of 100 data items received 300 during a time interval 500 between 12:00 AM and 12:15 AM on Jan. 1, 2016, to an output number 520 of 94 data items received 300 during the time interval 500 between 12:00 AM and 12:15 AM that were processed by every data processing module 237 of the data processing pipeline 235 during a predetermined period of time including the time interval 500 and a two-hour period 530 after the time interval 500. In the example of FIG. 5, the two-hour period 530 after the time interval 500 is an expected amount of time for a data item received at the input 236 of the data processing pipeline 235 to be processed by every data processing module 237 of the data processing pipeline 235. Data items processed after the predetermined period 530 are determined to be lost in the data processing pipeline 235 by the online system 140 or processed too late to be considered processed by the data processing pipeline 235. Based on a computed difference 540 between the input number 510 of 100 and the output number 520 of 94, the online system 140 determines 370 that six data items received 300 during the time interval 500 were lost in the data processing pipeline 235.

In some embodiments, the online system 140 also compares 360 an input module counter to an output module counter associated with a data processing module 237 of the data processing pipeline 235 for a time interval to determine whether the data processing module 237 failed to process one or more data items received 300 during the time interval. The online system 140 may compare 360 input module counters for each data processing module 237 of the data processing pipeline 235 for a time interval to corresponding output module counters for each data processing module 237 for the time interval to identify data processing modules 237 that failed to process one or more data items during the time interval. For example, the online system 140 compares the module input counter 460 and the module output counter 470 associated with each data processing module 237 of the data processing pipeline 235 for a particular time interval and determines a data item received 300 during the time interval was lost at a specific data processing module 237 if the module output counter 470 associated with the specific data processing module 237 is less than the module input counter 460 associated with the specific data processing module 237. As another example, referring to FIG. 4, the online system 140 determines 370 six data items were lost in the data processing module 237B based on a computed difference between the module input counter 460B associated with data processing module 237B and the module output counter 470B associated with data processing module 237B at the end of the predetermined period of time. The online system 140 may also compare an input module counter associated with a time interval and with a data processing module 237 with an input module counter associated with the time interval and with an additional data processing module 237; if the input module counter associated with the additional data processing module 237 is less than the input module counter associated with the data processing module 237, the online system 140 determines the data processing module 237 lost one or more data items. As another example, the online system compares an input module counter associated with the time interval and with the data processing module 237 to an output module counter associated with the time interval and with an additional data processing module 237 earlier in the data processing pipeline 235 than the data processing module 237. If the input module counter associated with the data processing module 237 is less than the output module counter associated with the additional data processing module 237, the online system 140 determines the data processing module 237 lost one or more data items.

In various embodiments, if the online system 140 determines 370 a data item was lost in the data processing pipeline 235, the online system 140 identifies the data item and sends the identified data item back through the data processing pipeline 235 (or a portion of the data processing pipeline 235) for processing by one or more data processing modules 237. For example, the online system 140 identifies lost data items by comparing a copy of the data store 230 generated at a time when all data items received 300 during a time interval have been stored to an additional copy of the data store 230 generated at a time when all data items received 300 during the time interval have been processed by the pipeline 235 and identifying data items included in the copy of the data store 230 but not in the additional copy of the data store as lost data items. In certain embodiments, information describing a state of each data item is stored in the data store 230 along with each data item and allows the online system 140 to determine whether a data item included in a copy of the data store 230 has been processed, has been partially processed, or has not been processed by a data processing module 237 of the data processing' pipeline 235. If information describing a state is stored along with a data item, the online system 140 may identify data items stored in the data store 230 during a time interval when a loss of data has been detected and process data items associated with information describing states indicating the data items have been not processed or have partially processed by one or more data processing modules 237 of the data processing pipeline 235.

In other embodiments, the online system 140 identifies lost data items by comparing stored copies of storage devices (e.g., buffers) coupled to an output of a data processing module 237 and coupled to an input of an additional data processing module 237 that store copies of each data item before being passed to the additional data processing module 237. The online system 140 identifies data items included in a copy of a storage device that are not included in a copy of an additional buffer that is later in the data processing pipeline 235 than the buffer. If the data processing pipeline 235 processes data items in a manner where the order in which the data items are received and processed and does not influence the output state of the processed data, the online system 140 sends a data item that has been identified as lost in the data processing pipeline 235 to one or more of the plurality of data processing modules 237 to complete processing. For example, the online system 140 sends a data item that has been identified as lost in the pipeline 235 to the input 236 of the data processing pipeline 235, so the data item processed by every data processing module 237 of the data processing pipeline 235. After being processed by every data processing module 237, the online system 140 stores the data item in its processed state in place of the unprocessed or partially processed state in which the data item was stored when identified as lost.

In some embodiments, the online system 140 may modify a data processing module 237 that lost a data item, if necessary, and reprocess the lost data item through the modified data processing module 237 and subsequent data processing modules 237 in the data processing pipeline 235. Referring to the example of FIG. 4, if the online system 140 determines 370 a data item was lost at data processing module 237B of the data processing pipeline 235, the online system 140 retrieves a copy of the data item from a stored copy of a buffer between data processing module 237A and data processing module 237B and sends the retrieved copy of the data item to data processing module 237B. After being processed by data processing module 237B, the processed data item is communicated to data processing module 237C and the remainder of the data processing pipeline 235 for further processing before being received at the output 238 of the data processing pipeline 235 and stored at the online system 140 in a processed state.

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving, at an input of a data processing pipeline of an online system, a plurality of data items describing one or more events, the data processing pipeline comprising a plurality of data processing modules;
   determining, from a plurality of consecutive time intervals, a time interval in which each data item of the plurality of data items was received;
   for each data item received during a particular time interval of the plurality of time intervals, incrementing an input counter associated with the particular time interval;
   determining, based on the input counter, an input number of data items that were received at the input of the data processing pipeline during the particular time interval;
   during the time interval and a predetermined period following the particular time interval, incrementing an output counter for each data item received during the particular time interval that was processed by every data processing module of the data processing pipeline;
   determining, based on the output counter, an output number of data items that were received at the input of the data processing pipeline during the particular time interval and that were processed by every data processing module of the data processing pipeline;
   comparing the input number of data items to the output number of data items for the particular time interval; and
   determining whether a data item received during the particular time interval was lost in the data processing pipeline based at least in part on the comparing.

2. The method of claim 1, wherein each of the plurality of data items comprises information describing a time at which the data item was received at the input of the data processing pipeline.

3. The method of claim 2, further comprising determining whether a data item was received during the particular time interval based at least in part on the information describing the time at which the data item was received at the input of the data processing pipeline.

4. The method of claim 1, further comprising:
   retrieving stored input information describing each data item received during the particular time interval responsive to determining the data item received during the particular time interval was lost in the data processing pipeline;

retrieving stored output information describing each data item received during the particular time interval that was processed by every data processing module of the data processing pipeline;

comparing the stored input information to the stored output information; and identifying a data item received during the particular time interval that was not processed by every data processing module of the data processing pipeline based at least in part on the comparing.

5. The method of claim 4, further comprising:

sending the identified data item received during the particular time interval that was not processed by every data processing module of the data processing pipeline to one or more of the plurality of data processing modules of the data processing pipeline; and processing the identified data item received during the particular time interval that was not processed by every data processing module of the data processing pipeline by the one or more data processing modules.

6. The method of claim 1, wherein a length of the predetermined period following the particular time interval is based at least in part on an expected length of time for every data processing module of the data processing pipeline to process the data item.

7. The method of claim 1, wherein each of the plurality of data processing modules is associated with one or more selected from a group consisting of: a module input counter storing a number of data items received at the input of the data processing pipeline during the particular time interval and that were received by the data processing module, a module output counter storing a number of data items received at the input of the data processing pipeline during the particular time interval that were processed by the data processing module, and any combination thereof.

8. The method of claim 7, further comprising:

for each data processing module, determining a number of data items received during the particular time interval that were processed by the data processing module based on the module input counter associated with the data processing module and the module output counter associated with the data processing module;

comparing the number of data items received during the particular time interval that were processed by each data processing module of the data processing pipeline; and determining whether the data item received during the particular time interval was not processed by a data processing module based at least in part on the comparing.

9. The method of claim 8, further comprising:

responsive to determining the data item received during the time interval was not processed by a data processing module, identifying the data processing module that did not process the data item based on a difference between an input counter of the identified data processing module and an input counter of an additional data processing module.

10. The method of claim 1, wherein the one or more events comprise interactions between a user of the online system and a content item presented to the user by the online system.

11. The method of claim 10, wherein the one or more events are associated with one or more selected from a group consisting of: accessing the content item by the user, presenting the content item in a display area of a client device associated with the user, purchasing a product associated with the content item by the user, and purchasing a service associated with the content item by the user.

12. A method comprising:

receiving, at an input of a data processing pipeline of an online system, an unordered stream of data comprising a plurality of data items describing one or more events;

associating a time-stamp with each data item of the plurality of data items, the time-stamp associated with a data item describing a time when data item was received at the input of the data processing pipeline;

determining a time interval in which each data item of the plurality of data items was received from a plurality of time intervals based at least in part on the time-stamp associated with each data item;

for each data item received during a particular time interval of the plurality of time intervals, incrementing an input counter associated with the particular time interval;

determining an input number of data items received during the particular time interval based part on a number of times the input counter was incremented;

during a predetermined period of time, incrementing an output counter for each data item received during the particular time interval that was processed by the data processing pipeline;

determining an output number of data items received during the particular time interval that were processed by the data processing pipeline based at least in part on a number of times the output counter was incremented;

computing a difference between the input number of data items and the output number of data items; and determining a number of data items received during the particular time interval that were not processed by the data processing pipeline based on the difference between the input number of data items and the output number of data items.

13. The method of claim 12, further comprising:

retrieving stored input information describing each data item received during the particular time interval;

retrieving stored output information describing each data item received during the particular time interval that was processed by the data processing pipeline;

comparing the stored input information to the stored output information; and identifying a data item received during the particular time interval that was not processed by the data processing pipeline based at least in part on the comparing.

14. The method of claim 13, further comprising:

sending the identified data item received during the particular time interval that was not processed by the data processing pipeline to the input of the data processing pipeline; and processing the identified data item by the data processing pipeline.

15. A computer program product comprising a non-transitory computer readable storage medium having instructions encoded thereon that, when executed by a processor, cause the processor to:

receive, at an input of a data processing pipeline of an online system, a plurality of data items describing one or more events, the data processing pipeline comprising a plurality of data processing modules;

determine, from a plurality of consecutive time intervals, a time interval in which each data item of the plurality of data items was received;

for each data item received during a particular time interval of the plurality of time intervals, increment an input counter associated with the particular time interval;

determine, based on the input counter, an input number of data items that were received at the input of the data processing pipeline during the particular time interval;

during the time interval and a predetermined period following the particular time interval, increment an output counter for each data item received during the particular time interval that was processed by every data processing module of the data processing pipeline;

determine, based on the output counter, an output number of data items that were received at the input of the data processing pipeline during the particular time interval and that were processed by every data processing module of the data processing pipeline;

compare the input number of data items to the output number of data items for the particular time interval; and determine whether a data item received during the particular time interval was lost in the data processing pipeline based at least in part on the comparing.

16. The computer program product of claim 15, wherein each of the plurality of data items comprises information describing a time at which the data item was received at the input of the data processing pipeline.

17. The computer program product of claim 16, wherein the computer readable storage medium further has instructions encoded thereon that, when executed by the processor, cause the processor to:

determine whether a data item was received during the particular time interval based at least in part on the information describing the time at which the data item was received at the input of the data processing pipeline.

18. The computer program product of claim 15, wherein the computer readable storage medium further has instructions encoded thereon that, when executed by the processor, cause the processor to:

retrieve stored input information describing each data item received during the particular time interval responsive to determining the data item received during the particular time interval was lost in the data processing pipeline;

retrieve stored output information describing each data item received during the particular time interval that was processed by every data processing module of the data processing pipeline;

compare the stored input information to the stored output information; and identify a data item received during the particular time interval that was not processed by every data processing module of the data processing pipeline based at least in part on the comparing.

19. The computer program product of claim 18, wherein the computer readable storage medium further has instructions encoded thereon that, when executed by the processor, cause the processor to:

send the identified data item received during the particular time interval that was not processed by every data processing module of the data processing pipeline to one or more of the plurality of data processing modules of the data processing pipeline; and process the identified data item received during the particular time interval that was not processed by every data processing module of the data processing pipeline by the one or more data processing modules.

20. The computer program product of claim 15, wherein a length of the predetermined period following the particular time interval is based at least in part on an expected length of time for every data processing module of the data processing pipeline to process the data item.

21. The computer program product of claim 15, wherein each of the plurality of data processing modules is associated with one or more selected from a group consisting of: a module input counter storing a number of data items received at the input of the data processing pipeline during the particular time interval and that were received by the data processing module, a module output counter storing a number of data items received at the input of the data processing pipeline during the particular time interval that were processed by the data processing module, and any combination thereof.

22. The computer program product of claim 21, wherein the computer readable storage medium further has instructions encoded thereon that, when executed by the processor, cause the processor to:

for each data processing module, determine a number of data items received during the particular time interval that were processed by the data processing module based on the module input counter associated with the data processing module and the module output counter associated with the data processing module;

compare the number of data items received during the particular time interval that were processed by each data processing module of the data processing pipeline; and determine whether the data item received during the particular time interval was not processed by a data processing module based at least in part on the comparing.

23. The computer program product of claim 22, wherein the computer readable storage medium further has instructions encoded thereon that, when executed by the processor, cause the processor to:

responsive to determining the data item received during the time interval was not processed by a data processing module, identify the data processing module that did not process the data item based on a difference between an input counter of the identified data processing module and an input counter of an additional data processing module.

24. The computer program product of claim 15, wherein the one or more events comprise interactions between a user of the online system and a content item presented to the user by the online system.

* * * * *

UNITED STATES PATENT AND TRADEMARK OFFICE
CERTIFICATE OF CORRECTION

PATENT NO. : 10,305,848 B2
APPLICATION NO. : 15/258966
DATED : May 28, 2019
INVENTOR(S) : Jason George McHugh, Nickolay Vladimirov Tchervenski and Yin Yin It is certified that error appears in the above-identified patent and that said Letters Patent is hereby corrected as shown below:

On the Title Page

Abstract, Column 2, item (57), Line 2, delete "To data loss" and insert -- To determine data loss --.

Abstract, Column 2, item (57), Line 15, delete "Lost Data" and insert -- Lost data --.

Signed and Sealed this
Fifth Day of November, 2019

Andrei Iancu
*Director of the United States Patent and Trademark Office*